April 22, 1969  A. GLOVATSKY ET AL  3,440,081
METHOD FOR THE FABRICATION OF IMAGE DISPLAY SCREENS
Filed Dec. 20, 1965

INVENTORS
ANDREW GLOVATSKY,
JOSEPH B. SHINAL, &
WALTER W. SLOBBE

ATTORNEY

United States Patent Office 3,440,081
Patented Apr. 22, 1969

3,440,081
METHOD FOR THE FABRICATION OF IMAGE DISPLAY SCREENS
Andrew Glovatsky, Joseph B. Shinal, and Walter W. Slobbe, Seneca Falls, N.Y., assignors to Sylvania Electric Products Inc., a corporation of Delaware
Filed Dec. 20, 1965, Ser. No. 514,901
Int. Cl. B05c 7/02; H01j 31/12
U.S. Cl. 117—34         4 Claims

ABSTRACT OF THE DISCLOSURE

Method and apparatus are disclosed for applying a substantially uniform coating of viscous material to a cathode ray tube face plate in a series of sequential passes each of which encompasses approximately half of the face plate area.

---

Figure 1:
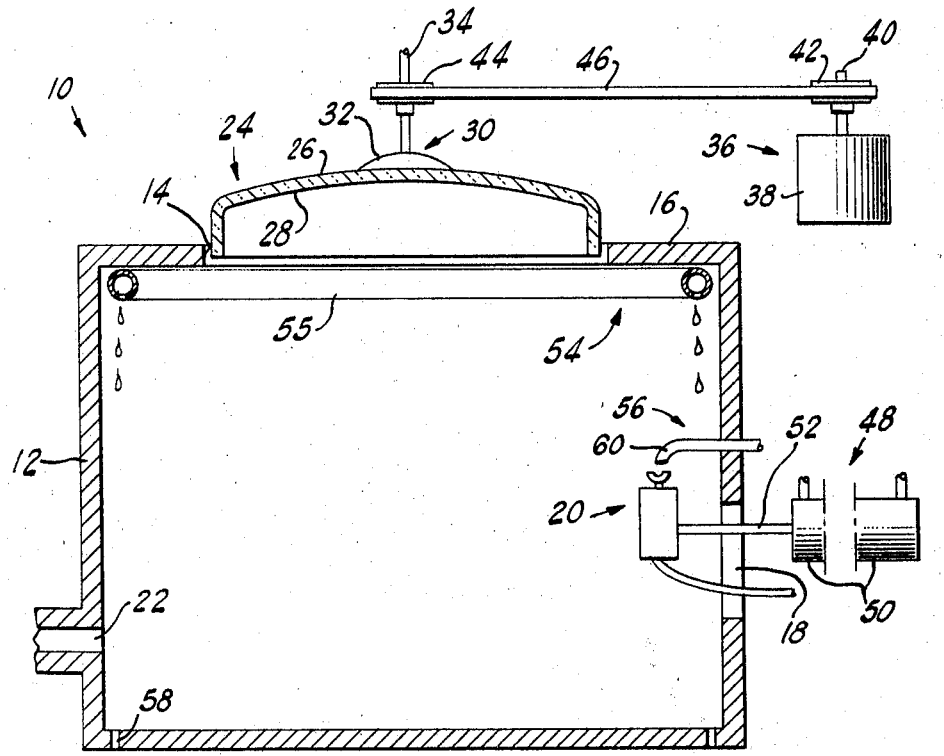

This invention relates to image display screens and more particularly to a method for forming such screens and to an apparatus adaptable for use in the screen fabrication process.

Image display screens of the type used in color television picture tubes usually comprise a transparent viewing panel having thereon a plurality of phosphor dots or stripes which will luminesce in various colors when excited by a proper source of energy. Screens of this type may be fabricated by photographic printing techniques wherein a photosensitized material is utilized to adhere the luminescent dots or stripes to the viewing panel. In one such process a photosensitized material, such for example as polyvinyl alcohol (PVA) may be applied to the viewing panel and a luminescent material in the form of a dry phosphor powder disposed thereover. The screen thus prepared is then exposed through a suitable negative to provide a predetermined pattern of exposed and unexposed areas. After exposure the panel is suitably developed to remove unexposed areas of phosphor and photosensitized material. The above steps are then duplicated for each of the colored light emitting phosphors desired in the finished device.

The application of the photosensitized material presents unique problems in that substantial uniformity of thickness and freedom from contaminants or foreign matter are required. One method previously used to apply this coating has been to position the viewing panel with the inner surface or screen surface positioned upwardly. A spray nozzle positioned over the panel is caused to spray the coating material downward upon the panel in a predetermined manner. This approach works quite well but requires periodic shut-downs so that the spraying area may be cleaned of foreign matter; thus it is not suited to the high production capabilities demanded by present and future needs. Much of this foreign matter consists of dried particles of the material being applied which have accumulated around the spray nozzle and the various hoses associated therewith and which occasionally flake off and fall to the screen positioned below. A dried particle falling onto the screen tends to dry out the areas immediately adjacent thereto by absorbing some of the solvent therein. These dried areas will not have sufficient adhesiveness to adequately bond the dry phosphor material and thus after the exposure and subsequent development of the screen these dried areas will be washed away leaving gaps in the final phosphor pattern of the tube which will make the tube unacceptable.

Accordingly, it is an object of this invention to enhance the fabriaction of image display screens.

It is another object of the invention to improve the quality of image display screens.

Yet another object of the invention is to reduce the amount of foreign matter ordinarily accumulated by such screens during processing.

Still another object of the invention is the provision of apparatus for achieving the above objects.

These and other objects are achieved in one aspect of the invention by applying a coating of material on the inner surface of an image display device viewing panel by positioning the viewing panel with the inner surface downward and spraying the material on the inner surface by directing a spray upwards to the viewing panel while effecting relative longitudinal movement between the viewing panel and the spray.

This method substantially reduces the amount of foreign matter accumulated by the viewing panels since the force of gravity attracts foreign particles away from the viewing panels and greatly enhances the fabrication thereof.

For a better understanding of the present invention, together with other and further objects, advantages, and capabilities thereof, reference is made to the following disclosure and appended claims in connection with the accompanying drawings in which:

FIG. 1 is a diagrammatic elevational view of apparatus for carrying out the process; and FIGS. 2 thru 5 are diagrammatic representations of sequential steps in the process.

Referring now to the drawings with greater particularity, in FIG. 1 there is shown an apparatus 10 for spraying image display device viewing panels. Apparatus 10 comprises a substantially closed container 12 provided with a panel receiving aperture 14 in the upper surface 16 thereof. A lower portion of container 12 is provided with entry means 18 for spraying means 20. Exhaust means 22 is also formed in container 12 and is preferably positioned beneath the plane of operation of spraying means 20.

A viewing panel 24 having an outer surface 26 and an inner usrface 28 is mounted over aperture 14 by panel positioning means 30, which may comprise a suction cup 32 and a vertically projecting shaft 34. Means for supplying angular movement to panel 24 is designated generally 36 and may include a motor 38 having a shaft 40 and a pulley 42 mounted thereon. A mating pulley 44 is mounted on shaft 34 and is connected to pulleys 42 by belt 46. Means for imparting longitudinal movement to spraying means 20 is indicated generally at 48 and may include a fluid motor 50 having a shaft 52 to which is attached spraying means 20. Also provided, within container 12, are humidity control means 54 and spray head cleaning means 56.

Figures 2, 3, 4, 5:
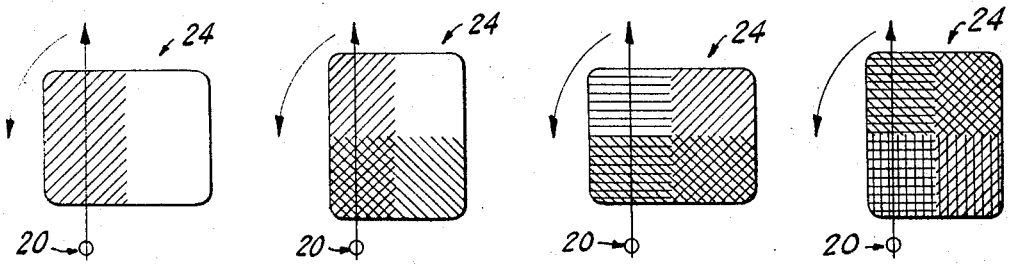

The operation of apparatus 10 will now be described. A viewing panel 24 is positioned over aperture 14 with its inner surface 28 downward. Energizing means, not shown, will activate fluid motor 50 and spraying means 20. As the spraying means 20 makes a longitudinal pass beneath panel 24 a coating of the sprayed material is applied to inner surface 28. After a complete traverse of the panel the spray is shut off and the spraying means 20 retracts to its starting position. Obviously, the spray may also be energized during the retraction of spraying means 20 if desired. While it would, of course, be possible to apply the coating in the desired thickness in one longitudinal pass, it is desirable, for purposes of applying a more uniform thickness of material having a more uniform wetness, to apply the material sequentially in a series of passes. One manner of sequential build-up is shown diagrammatically in FIGS. 2 thru 5. In FIG. 2 is shown a panel 24 and spraying means 20 which is offset from the center of the panel. The width of the spray emanating from spraying means 20 is such that it extends approximately to the center of the screen. The arrow indicates the direction of the first pass of the spraying means and the cross hatched area indicates the area sprayed.

After the completion of this first pass motor 38 is energized, by means not shown, and accomplishes, through pulleys 42, 44 and belt 46, a desired amount of angular movement of panel 24. While in this instance the movement is 90° and four such movements will be used to completely coat a panel, it will be shown hereinafter that other angular movements may be used. When the angular movement of the panel is completed, fluid motor 50 and spraying means 20 are again energized and a second pass is made, as is shown in FIG. 3. The cycle of angular movement of the panel and longitudinal movement of the spraying means is continued until the entire inner surface is coated to the desired thickness. In the embodiment illustrated in FIGS. 2 thru 5 the panel is coated in a sequence of four passes with substantially one-half the finally desired thickness being applied on each pass. Generally speaking then, it may be said that if the finished thickness of the coating of material is substantially uniformly equal to Y; the number of angular movements is equal to X (where X is any even integer); the number of longitudinal spraying movements per angular movement is equal to Z; then the total number of spraying movements per panel is equal to XZ and the thickness of the material applied on any one spraying pass is substantially equal to $2Y/XZ$.

This method of spraying produces viewing panels having thereon a coating of material characterized by a substantially uniform thickness and virtual freedom from particles of foreign matter. Exhaust means 22, which operates during the spraying cycle serves to remove from the atmosphere particles of sprayed material which were not deposited on the screen.

Further improvements with regard to this invention include means for retarding the formation of dried particles of sprayed material. As stated hereinbefore, the photosensitive materials with which this invention is chiefly concerned usually comprise a solute and a relatively volatile solvent. Since a substantially uniform wetness of the applied coating is necessary to insure an even distribution of phosphor during subsequent processing, the importance of this wetness will be readily understood.

In prior techniques the spraying operation took place in dry air. The effect of this on the sprayed material may be better understood from the following example. Four hundred fifty-four grams of dry air at 70° F. which contain no moisture has a capacity at saturation of holding 7.1278 grams of moisture. If a photosensitive solution of 20 grams is used for spraying and 20% of this solution is solute then there are 4 grams of solute and 16 grams of solvent. Therefore, four hundred fifty-four grams of dry air has the capacity to absorb approximately 45% of the solvent thereby causing an excessive drying rate of the sprayed material. To alleviate this problem there is incorporated in apparatus 10 the before mentioned humidity control means 54 which functions to maintain the atmosphere within container 12 at substantially its saturation point, thereby reducing the amount of evaporation of solvent. The means 54 may comprise a perforated tube 55 which extends substantially around the inside perimeter of container 12 near its upper surface and which releases a suitable atmosphere saturating fluid, such as water. The amount of fluid released is such that the sides of container 12 are continually wetted thereby. Suitable drainage means, such as holes 58, are provided in the base of container 12.

To insure a consistent uniformity in the spray itself, means 56 for periodically cleaning the spray head is also provided. The means may comprise a hose 60 through which a flushing solution, such as warm water, may be directed upon the spray head during inoperative periods thereof.

There has thus been provided by this invention a method and apparatus for enhancing the techniques of viewing panel fabrication. The uniformity of the thickness of the applied material and the uniformity of its wetness together with its substantial freedom from dried spots and accumulated foreign matter combine to provide superior results unobtainable with prior art processes.

While there has been shown and described what is at present considered the preferred embodiment of the invention, it will be obvious to those skilled in the art that various changes and modifications may be made therein without departing from the scope of the invention as defined by the appended claims.

What is claimed is:

1. In the method of providing a coating of material on the inner surface of an image display device viewing panel, the steps comprising: positioning said viewing panel with said inner surface downward; effecting periodic angular movement of said viewing panel; and spraying said material on said inner surface of said viewing panel during rest periods of said angular movement by directing a spray upwards to said viewing panel while effecting relative longitudinal movement between said viewing panel and said spray; said coating having a finished thickness equal to Y; the number of angular movements is equal to X where X is an even integer; the total number of longitudinal spraying movements is equal to Z; and the total number of spraying movements per panel is equal to XZ and substantially one-half of the panel is covered on each pass with the thickness of the material applied on any one spraying pass being equal to $2Y/XZ$.

2. The method of claim 1 wherein said spraying is carried out in a chamber having a controlled humidity.

3. The method of claim 1 wherein said coating comprises a photosensitized material.

4. The method of claim 1 wherein said viewing panel is a cathode ray tube face plate.

References Cited

UNITED STATES PATENTS

| 1,111,443 | 9/1914 | Dunton | 117—105.4 |
| 2,903,377 | 9/1959 | Saulnier | 117—33.5 |
| 2,967,783 | 1/1961 | Shinal | 117—34 |

DAVID KLEIN, *Primary Examiner.*

U.S. Cl. X.R.

117—105.3, 105.4; 118—300